United States Patent [19]

Fehlbier et al.

[11] Patent Number: 5,077,349

[45] Date of Patent: Dec. 31, 1991

[54] HIGHLY FLEXIBLE POLYURETHANE PLASTICS AND COATINGS WHICH ARE RESISTANT TO CHEMICALS AND A PROCESS FOR THEIR PRODUCTION

[75] Inventors: Alois Fehlbier, Burscheid; Hermann Gruber, Leverkusen, both of Fed. Rep. of Germany

[73] Assignee: Bayer Aktiengesellschaft, Leverkusen, Fed. Rep. of Germany

[21] Appl. No.: 519,713

[22] Filed: May 7, 1990

[30] Foreign Application Priority Data

May 11, 1989 [DE] Fed. Rep. of Germany ....... 3915426

[51] Int. Cl.$^5$ ............................................. C08F 45/52
[52] U.S. Cl. .................................... 524/705; 124/706; 124/871; 525/131; 528/48; 528/77; 528/85
[58] Field of Search ............... 427/885.5, 140; 528/75, 528/48, 77, 85; 524/705, 706, 871; 525/131

[56] References Cited

U.S. PATENT DOCUMENTS

| | | | |
|---|---|---|---|
| 2,877,242 | 3/1959 | Selligman et al. | 528/75 |
| 3,505,275 | 4/1970 | Sato et al. | 260/871 X |
| 3,637,558 | 6/1972 | Verdol et al. | 524/705 |
| 3,790,518 | 2/1974 | Shearing | 524/6 |
| 4,205,138 | 5/1980 | Möller et al. | 528/85 |
| 4,211,680 | 7/1980 | Shearing | 524/650 |
| 4,255,529 | 3/1981 | Möhring et al. | 528/77 |
| 4,320,208 | 3/1982 | Reisch et al. | 528/48 |
| 4,326,086 | 4/1982 | Möring et al. | 528/77 |
| 4,609,572 | 9/1986 | Gruber et al. | 427/385.5 |
| 4,778,844 | 10/1988 | Blount | 524/706 |

FOREIGN PATENT DOCUMENTS 1147695 4/1969 United Kingdom .
1333263 10/1973 United Kingdom .
1373214 11/1974 United Kingdom .
1413121 11/1975 United Kingdom .

Primary Examiner—Morton Foelak
Assistant Examiner—Duc Truong
Attorney, Agent, or Firm—Joseph C. Gil; Thomas W. Roy

[57] ABSTRACT

The present invention relates to a process for the preparation of highly flexible polyurethane plastics which are resistant to chemicals by reacting
a) a polyisocyanate component with
b) a polyol component based on a liquid polybutadiene resin containing terminal hydroxyl groups and having a molecular weight of about 500 to 10,000 and
c) about 10 to 50% by weight of water, based on the weight of component b), in the presence of
d) about 20 to 500% by weight, based on the weight of component b), of an alkaline earth metal hydroxide or oxide.

The present invention also relates to the highly flexible polyurethane plastics, especially coatings, produced by this process.

20 Claims, No Drawings

HIGHLY FLEXIBLE POLYURETHANE PLASTICS AND COATINGS WHICH ARE RESISTANT TO CHEMICALS AND A PROCESS FOR THEIR PRODUCTION

BACKGROUND OF THE INVENTION

1. Field of the Invention

The present invention relates to a new process for the preparation of highly flexible polyurethane plastics, especially polyurethane coatings, which are resistant to chemicals, and to a process for their preparation. The plastics are prepared in the presence of hydroxides or oxides of alkaline earth metals and are based on certain polybutadiene resins containing terminal hydroxyl groups.

2. Description of the Prior Art

The use of hydroxides or oxides of alkaline earth metals in the preparation of non-foamed polyurethane plastics using water-containing reactive systems based on organic polyisocyanates and isocyanate-reactive organic compounds is known. For example, DE-PS 1 170 627 describes the action of calcium oxide as a dehydrating agent in polyurethane systems. GB-PS 1 147 695 describes inter alia the use of calcium hydroxide in water-containing reactive systems for the preparation of non-foamed polyurethane plastics. Hydraulic cements have also been used for foam prevention in water-containing polyurethane systems (see, e.g., DE-OS 2 113 046, DE-OS 2 254 251, DE-OS 2 113 042, DE-OS 2 300 206 or DE-AS 1 924 468). While the resulting products of these prior publications are often very flexible, they do not have adequate water resistance. The water resistance cannot be improved by the addition of bitumen, since the compatibility of these systems with bitumen is inadequate.

To the contrary the coatings prepared in accordance with DE-OS 3 414 807 are very hard, but do not have sufficient flexibility for many applications.

Accordingly, it is an object of the present invention to overcome the deficiencies of the known processes for the preparation of highly flexible plastics, especially highly flexible surface coatings based on polyurethane systems containing water and inorganic fillers. It is an additional object to provide reactive systems which can be used to prepare plastics, especially coatings, which are at least equivalent to those prepared from prior art systems with respect to flexibility and other properties, but also have improved water resistance and, in particular, bitumen compatibility.

This object was achieved in accordance with the present invention as described hereinafter.

SUMMARY OF THE INVENTION

The present invention relates to a process for the preparation of highly flexible polyurethane plastics which are resistant to chemicals by reacting a) a polyisocyanate component with
b) a polyol component based on a liquid polybutadiene resin containing terminal hydroxyl groups and having a molecular weight of about 500 to 10,000 and
c) about 10 to 50% by weight of water, based on the weight of component b), in the presence of
d) about 20 to 500% by weight, based on the weight of component b), of an alkaline earth metal hydroxide or oxide.

The present invention also relates to the highly flexible polyurethane plastics, especially coatings, produced by this process.

DESCRIPTION OF THE INVENTION

Suitable organic polyisocyanates for use as polyisocyanate component a) are those which are liquid at room temperature such as liquid polyisocyanates based on diisocyanatodiphenylmethane (i.e., liquid mixtures of 4,4'-diisocyanataodiphenylmethane with 2,4'-diisocyanatodiphenylmethane; liquid derivatives of 4,4'-diisocyanatodiphenylmethane and optionally 2,4'-diisocyanatodiphenylmethane, e.g., reaction products with less than the equivalent amounts of polyhydric alcohols, in particular polypropylene glycols having a molecular weight of up to 700; and the carbodiimide-modified derivatives of these isocyanates), tris-(isocyanatohexyl) isocyanurate or mixtures thereof with its higher homologues, tris-(isocyanatohexyl)-biuret or mixtures thereof with its higher homologues and liquid, low molecular weight NCO prepolymers based on 2,4- and/or 2,6-diisocyanatotoluene. Preferably, however, polyisocyanate mixtures of the diphenylmethane series which may be obtained by the phosgenation of aniline/-formaldehyde condensates and which have a viscosity at 23° C. of 50 to 400 mPa.s are used as polyisocyanate component a). Mixtures of these polyisocyanates may also be used. The polyisocyanate component a) is used in those amounts sufficient to provide an isocyanate index of at least 50, preferably 80 to 200. "Isocyanate index" means the number of isocyanate groups divided by the number of groups which are reactive with isocyanate groups times 100; water is included in the calculation as a bifunctional compound.

Polyol component b) is based on liquid polybutadiene resins which contain at least two, preferably two, terminal alcoholic hydroxyl groups and have a molecular weight (which can be calculated from the hydroxyl group content and the hydroxyl functionality) of about 500 to 10,000, preferably about 700 to 5,000 and more preferably about 2,000 to 4,000. The polybutadiene resins marketed by the ARCO Chemical Company under the name Poly B-D resins, for example, are particularly suitable as component b).

Component c) is water, which is employed in an amount of about 10 to 50% by weight, preferably about 10 to 20% by weight, based on the weight of component b).

Component d) is based on hydroxides and oxides of alkaline earth metals such as magnesium oxide, magnesium hydroxide, calcium oxide and calcium hydroxide. Calcium hydroxide is preferred. The hydroxides and oxides are used in amounts of about 20 to 500% by weight, preferably about 50 to 100% by weight, based on the weight of component b). The alkaline earth metal hydroxides and oxides can also be used in the form of inorganic additives which contain substantial amounts of these inorganic compounds. For example, cements such as Portland cement or blast furnace cement may be used.

The preferred organic auxiliaries and additives e) which may optionally be used include bituminous substances such as bitumen oils or asphalts from petroleum, which may be employed as a solution in a plasticizer. These bituminous substances may be employed in amounts of up to 500% by weight, preferably up to 400% by weight and more preferably 10 to 100% by weight, based on the weight of component b).

Other inorganic auxiliaries and additives which may optionally be used include mineral additives (such as quartz flour, sand, barium sulphate and calcium carbonate), inorganic pigments, carbon black, graphite or coke grit. The last two additives can be used to produce coatings having a resistance value which is below the value of $10^6 \Omega$ required for electrically conductive coatings. The mineral fillers may be used in amounts of up to 40 times the weight of component b).

Other optional organic auxiliaries and additives which may be used include:

plasticizer oils such as phenyl alkanesulphonates (prepared by sulphochlorination of alkanes or alkane mixtures having 10 to 18 carbon atoms and subsequent esterification with phenol), dibutyl phthalate, tributyl phosphate and other plasticizer oils, e.g., those used for plasticizing polyvinyl chloride. These plasticizer oils also belong to the preferred class of organic auxiliaries and additives and may be employed in amounts of up to 150% by weight, preferably 10 to 120% by weight, based on the weight of component b).

emulsifiers, preferably non-ionic emulsifiers (such as ethoxylation products of alkylphenols, especially iso-nonylphenol) which may be employed in amounts of up to 20% by weight, preferably up to 15% by weight, based on the weight of component b).

known foam retardants and flexible organic fillers such as rubber flours.

Glycerol is generally not used in the preparation of the reactive systems according to the invention, i.e., these reactive systems are essentially glycerol-free mixtures.

In principle, the individual components mentioned as examples can be mixed with one another in any desired sequence for the preparation of the coating compositions according to the invention. Preferably, however, a procedure is followed in which component b) is first mixed with the organic auxiliaries and additives (emulsifiers, plasticizer oils and other auxiliaries), and then the inorganic constituents are stirred in. Water is then dispersed in the mixture and the entire mixture is blended with the polyisocyanate component. The reactive systems are generally prepared at room temperature.

The reactive systems according to the invention have a processing time of at least 30 minutes at 23° C. They are suitable for the production of films, casting compositions, sealants, flexible coverings (in particular floor coverings) and also for the production of joint layers in the laying of ceramic sheets. However, the reactive systems according to the invention are preferably used as coating compositions for coating any desired substrates. They can be processed in the customary manner, for example with rollers or spatulas, and subjected to load after about 24 hours. They are also particularly suitable for coating moist concrete surfaces. The hardened coatings have excellent flexibility and water resistance. Because of their high flexibility, they are particularly suitable for large-area seals on concrete surfaces at risk from cracking and for the production of liquid-tight coatings in the industrial sector. A particularly interesting use for the reactive systems according to the invention is for sealing steel constructions such as garage decks or bridges, which may corrode under the influence of salts and other substances which damage buildings. Using the process according to the invention, a flexible membrane coating is produced which, after hardening, can be covered with a conventional bitumen-bonded sealing layer. The sealing layer can also be applied without problems at elevated temperature.

The following examples serve to further illustrate the process according to the invention. All percentages are percent by weight, unless otherwise indicated.

EXAMPLES

Example 1 a) 550 parts of a polybutadiene resin having terminal hydroxyl groups, a molecular weight of 2,800 and an OH number of 46.6 (Poly B-D Resin R-45HT from ARCO Chemical Company) were initially introduced into a stirred kettle and dispersed with 3.3 parts of a commercially available aerating agent (Byk 066 from Byk Chemie GmbH D-4230 Wesel) and 33.3 parts of an aqueous solution of a commercially available emulsifier (ethoxylated isononylphenol, Marlophen from Chemische Verke Hllls AG) for 10 minutes in a dissolver at a speed of rotation of 1,000 rpm. After the addition of 180 parts of a phenyl ester of an industrial $C_{12}$–$C_{18}$-alkanesulphonate (plasticizer) and 2 parts of a commercially available dispersing agent (Byk P104 from Byk Chemie GmbH), the dispersing operation was continued for a period of 10 minutes.

170 parts calcium hydroxide were then introduced and dispersed at 1,000 rpm. After 10 minutes, 60 parts of water were added and the dispersing operation was continued at 1,000 rpm for a further 15 minutes. A storage-stable emulsion having a viscosity 6,000 mPa.s at 23° C. was obtained.

b) 100 parts of the emulsion prepared according to 1a) were mixed with 10 parts of a polyisocyanate mixture of the diphenylmethane series having an NCO content of 31% and a viscosity of 120 mPa.s at 23° C. (isocyanate index). Finally, a filler (100 parts of barytes) was also mixed homogeneously into the two-component system.

The ready-to-use mixture had a self-flowing consistency and was applied to a concrete surface with the aid of a smoothing trowel. The concrete surface had been previously primed with a 60% by weight solution of an NCO prepolymer in xylene having an NCO content (based on solids) of 16% by weight. The NCO prepolymer was prepared by reaction of (i) a polyisocyanate mixture of the diphenylmethane series which was essentially based on 4,4'-diisocyanatodiphenylmethane with (ii) a mixture of equal parts by weight of a polypropylene glycol having a molecular weight of 2,000 and a polyether polyol having a molecular weight of 3,700 and prepared by the addition of propylene oxide to ethylenediamine.

The processing time of the coating composition, which was applied at a coating thickness of about 2 mm, was about 40 minutes (23° C.). The flexible coating hardened without trouble and had the following mechanical properties:

| Tensile strength (DIN 53 504): | 1.5 mPa |
|---|---|
| Elongation at break (DIN 53 504): | 185% |
| Tear propagation resistance (DIN 53 515): | 5.5 N/mm |
| Shore hardness A (DIN 53 505): | 50 |

Example 2

Example 1b) was repeated with the exception that before the filler was incorporated, 50 parts of bitumen (Spramex 200 from Deutsche Shell AG) were stirred homogeneously into the emulsion. The emulsion was compatible with the bitumen and was storage-stable for several months. After addition of the filler and the polyisocyanate, a coating composition with a processing time of 50 minutes (23° C.) was obtained.

A hardened coating prepared from this coating composition had the following properties:

| Tensile strength (DIN 53 504): | 1.2 mPa |
| Elongation at break (DIN 53 504): | 300% |
| Tear propagation resistance (DIN 53 515): | 5.0 N/mm |
| Shore hardness A (DIN 53 505): | 45 |

Although the invention has been described in detail in the forgoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a highly flexible polyurethane plastic which is resistant to chemicals which comprises reacting
    a) a polyisocyanate component with
    b) a polyol component which is essentially glycerol-free and comprises a liquid polybutadiene resin containing terminal hydroxyl groups and having a molecular weight of about 500 to 10,000 and
    c) about 10 to 50% by weight of water, based on the weight of component b), in the presence of
    d) about 20 to 500% by weight, based on the weight of component b), of an alkaline earth metal hydroxide or oxide.

2. The process of claim 1 wherein said highly flexible polyurethane plastic is a highly flexible polyurethane coating.

3. The process of claim 1 wherein the reaction is conducted in the presence of a positive amount of up to 500% by weight, based on the weight of component b), of a bituminous additive.

4. The process of claim 2 wherein the reaction is conducted in the presence of a positive amount of up to 500% by weight, based on the weight of component b), of a bituminous additive.

5. The process of claim 1 wherein said polyisocyanate component a) comprises a mixture containing 4,4'-diisocyanatodiphenylmethane in an amount sufficient to provide an isocyanate index of at least 50.

6. The process of claim 2 wherein said polyisocyanate component a) comprises a polyisocyanate mixture containing 4,4'-diisocyanatodiphenylmethane in an amount sufficient to provide an isocyanate index of at least 50.

7. The process of claim 3 wherein said polyisocyanate component a) comprises a polyisocyanate mixture containing 4,4'-diisocyanatodiphenylmethane in an amount sufficient to provide an isocyanate index of at least 50.

8. The process of claim 4 wherein said polyisocyanate component a) comprises a polyisocyanate mixture containing 4,4'-diisocyanatodiphenylmethane in an amount sufficient to provide an isocyanate index of at least 50.

9. The process of claim 1 wherein the reaction is additionally conducted in the presence of a member selected from the group consisting of sand, coke grit, pigments, carbon black, graphite and mixtures thereof.

10. The process of claim 1 wherein the reaction is additionally conducted in the presence of a member selected from the groups consisting of plasticizer oils, emulsifiers, foam retardants, rubber flour and mixtures thereof.

11. A highly flexible polyurethane plastic which is resistant to chemicals and comprises the reaction product of
    a) a polyisocyanate component with
    b) a polyol component which is essentially glycerol-free and comprises a liquid polybutadiene resin containing terminal hydroxyl groups and having a molecular weight of about 500 to 10,000 and
    c) about 10 to 50% by weight of water, based on the weight of component b), in the presence of
    d) about 20 to 500% by weight, based on the weight of component b), of an alkaline earth metal hydroxide or oxide.

12. The plastic of claim 11 wherein said highly flexible polyurethane plastic is a highly flexible polyurethane coating.

13. The plastic of claim 11 wherein the reaction is conducted in the presence of a positive amount of up to 500% by weight, based on the weight of component b), of a bituminous additive.

14. The coating of claim 12 wherein the reaction is conducted in the presence of a positive amount of up to 500% by weight, based on the weight of component b), of a bituminous additive.

15. The plastic of claim 11 wherein said polyisocyanate component a) comprises a polyisocyanate mixture containing 4,4'-diisocyanatodiphenylmethane in an amount sufficient to provide an isocyanate index of at least 50.

16. The coating of claim 12 wherein said polyisocyanate component a) comprises a polyisoyanate mixture containing 4,4'-diisocyanatodiphenylmethane in an amount sufficient to provide an isocyanate index of at least 50.

17. The plastic of claim 13 wherein said polyisocyanate component a) comprises a polyisocyanate mixture containing 4,4'-diisocyanatodiphenylmethane in an amount sufficient to provide an isocyanate index of at least 50.

18. The coating of claim 14 wherein said polyisocyanate component a) comprises a polyisocyanate mixture containing 4,4'-diisocyanatodiphenylmethane in an amount sufficient to provide an isocyanate index of at least 50.

19. The plastic of claim 11 wherein the reaction is additionally conducted in the presence of a member selected from the group consisting of sand, coke grit, pigments, carbon black, graphite and mixtures thereof.

20. The plastic of claim 11 wherein the reaction is additionally conducted in the presence of a member selected from the groups consisting of plasticizer oils, emulsifiers, foam retardants, rubber flour and mixtures thereof.

* * * * *